Nov. 15, 1966
J. L. BIACH
3,285,568
TENSIONING APPARATUS
Filed March 17, 1965
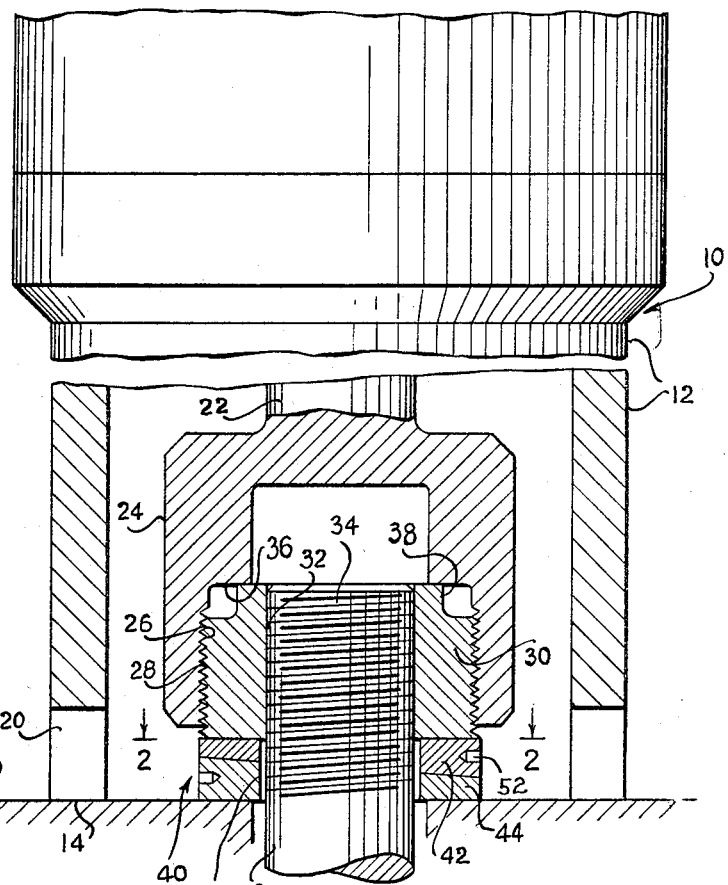
FIG.1.
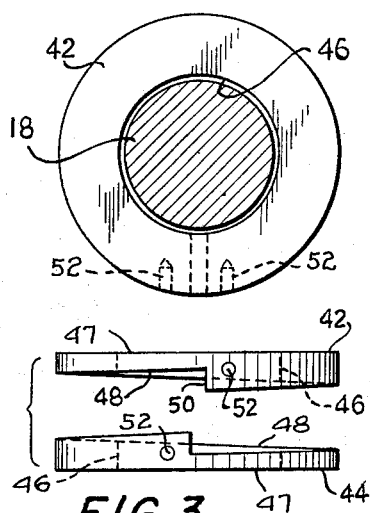
FIG.2.
FIG.3.
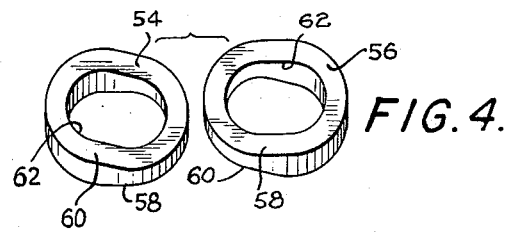
FIG.4.
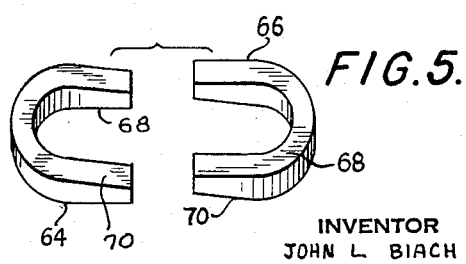
FIG.5.
INVENTOR
JOHN L. BIACH
BY
Kane, Dalsimer & Kane
ATTORNEYS __United States Patent Office__

3,285,568
Patented Nov. 15, 1966

3,285,568
TENSIONING APPARATUS
John L. Biach, Cranford, N.J., assignor to Biach Industries, Inc., Cranford, N.J., a corporation of New Jersey
Filed Mar. 17, 1965, Ser. No. 440,386
11 Claims. (Cl. 254—29)

The present invention relates to stud tensioners and, more particularly, to precise loading of studs and bolts by an improved technique and attendant structure.

In ordinary tensioning, the puller bar of a tensioning apparatus attaches to the threaded end of a stud or bolt that projects beyond a threadedly engaged nut thereon. After the load is supplied and the bolt tensioned, the nut is run down on the bolt and then the load is released. In this instance, the nut is not under any stress whatsoever during tensioning but following run down and release of the load, the nut will become pressurized and absorb a certain percentage of the stress introduced into the bolt as tensioner. In order, therefore, to achieve a certain desired load or tensioning of the bolt, it is necessary for the tensioner to exert some additional force beyond the required load. In the case of very short studs, this additional load may be quite substantial and may be of a magnitude of 50% or even higher. In some instances, it may be desired to stress the bolt or stud close to its yield point; and, therefore, it would be impossible or quite dangerous to overstress the bolt in order to compensate for the stress relief upon release of the tensioning apparatus and absorption of stress by the nut.

It is, therefore, a principal object to provide an improved tensioning system and improved technique and structure therefor for tensioning studs whereby the load loss incident to unstressed parts during the tensioning cycle is held at a minimum.

In accordance with this invention, a stud tensioning system contemplates the employment of one of a number of bolts or studs, one end of which extends from a surface of a member through which the bolt is inserted. This projecting end of the bolt is provided with a nut or equivalent structure which will, in effect, serve as an extension of the bolt. A bolt tensioning apparatus is employed and is provided with a housing having one end adapted to thrust against the surface from which the bolt extends. A puler bar of this tensioning apparatus is adapted to engage with surfaces of the nut or equivalent structure in a releasable manner. Tensioning means forming part of the apparatus operates to exert a pull on the puller bar and, consequently, tension the bolt through or by means of the nut. Wedge means which may be in the form of a pair of washers having inclined surfaces that may be slid one upon the other to produce a wedging action are interposed between the nut and the surface through which the bolt extends for taking up the slack therebetween. In other words, the effective longitudinal width of the wedging means is adjusted to extend the washers between the available space between the nut and the surface through which the bolt extends. Inasmuch as the thickness of the wedging means is relatively small, there is no appreciable load loss as a result of its compression upon release of the tensioning means. The bolt will, accordingly, be maintained at the desired degree of tension without experiencing any substantial load loss due to the presence of unstressed parts.

Other objects and advantages will become apparent from the following detailed description which is to be taken in conjunction with the accompanying drawings in which preferred embodiments of this invention are illustrated and in which:

FIG. 1 is an enlarged fragmentary elevational view with certain parts broken away removed and sectioned for clarity illustrating the manner in which the puller bar of a tensioning apparatus is coupled with a nut mounted on the end of a threaded bolt with wedging means placed between the nut and the surface from which the bolt extends;

FIG. 2 is a cross sectional view taken along the line 2—2 of FIG. 1 showing in plan one embodiment of wedging means contemplated by this invention;

FIG. 3 is an elevational view of a pair of cooperating circular washers adapted to perform the desired wedging action;

FIG. 4 is a perspective view of a pair of mating washers constituting another embodiment of wedging means in which the washers assume an essentially oval configuration; and FIG. 5 is a similar perspective view of a further embodiment of wedging means in which the individual washers are essentially U-shaped.

In the drawings, a stud tensioner 10 is partly illustrated and includes a housing 12 having a lower or base end 14 adapted to be thrust against or otherwise placed in engagement with surface 16 of the member through which bolt or stud 18 extends. A suitable number of windows 20 are provided for convenient access to the interior of the housing 12 and for purposes to be explored in detail shortly. A pull bar or rod 22 is mounted interiorly of the housing 12 and is coupled with the actual tensioning portion of the apparatus which may assume the form of any one of a number of mechanisms including that described in my earlier U.S. Patents Nos. 2,866,370, granted December 30, 1958, 3,015,975 granted January 9, 1962, 3,158,052 granted November 24, 1964, and 3,162,071 granted December 22, 1964. This tensioning portion is operable to pull or urge the rod 22 upwardly. The lower end of the pull rod or bar 22 includes an enlarged socket 24 which, according to the illustrated exemplary embodiment, is provided with internal threads 26 adapted to mesh with mating external threads 28 formed on nut 30. This nut is also provided with internal threads 32 which mate with external threads 34 on the end of the bolt 18. Under these circumstances, the pull rod 22 will be advantageously coupled with means to permit its rotation relative to the nut 30 to arrive at the desired threaded engagement of the threads 26 and 28. In order to limit the extent of this engagement, a shoulder 36 may be provided on the interior of the socket 24 for eventual engagement with the top of the nut 30. In this manner, the lower end of the socket 24 will not project beyond the corresponding end of the nut 30 for purposes that will become evident shortly. In this connection, the external threads 28 on the nut 30 may end short of the lower end of the nut and, consequently, not extend for the full length of the nut. The upper portion 38 of the nut 30 can be hexagonal for convenience in screwing it on to the stud 18. Following the tensioning of the bolt 18 through the nut 30 by means of the tensioning apparatus 10, a wedging means 40 interposed between the lower end of the nut 30 and the surface 14 are actuated to fix the stress with negligible loss of load.

The wedge means 40 in the exemplary embodiment of FIGS. 1 to 3 comprises a pair of mating washers 42 and 44 both of which are essentially circular in configuration with a circular central opening 46 through which the bolt 18 extends. Each washer is provided with one flat surface 47 and an annular inclined surface 48. The low point of this inclined surface defines a step 50 with the high point thereof. With the two washers 42 and 44 together and the shoulders or steps 50 adjacent one another, the overall height of the wedging means 40 will be at a minimum. As one washer is rotated with respect to the other, the effective height or thickness of the wedging means 40 will increase proportionately. The two flat surfaces 47 of the washers will spread apart and maintain a substantial parallel relationship until the entire space between the lower end of the nut 30 and surface 14 is traversed. The angle of inclination of the inclined surface 48 is relatively small and below the critical friction angle whereupon there will be no relative movement of the washers upon release of the nut 30 by the tensioner socket 24. In addition, the thickness of the washers 42 and 44 may be held at a minimum and need not be of any substantial thickness whereupon no appreciable loss of load will be experienced as a result of compression of these washers upon release of the nut 30 by the tensioning apparatus 10. In order to facilitate the relative rotation of the washers 42 and 44, a recess or opening 52 may be provided for the reception of a suitable tool for such purposes that may be inserted through the adjacent window 20.

When tensioning a stud 18, the washers 42 and 44 are first set at their minimum height and the nut 30 is brought down to bear against the washers. The stud 18 does not have to project beyond the top of the nut 30 although there is no objection if this happens to occur. After applying a predetermined load through the puller bar 22 to the nut 30 and, in turn, to the stud 18, the nut will have lifted a small amount off of the pair of mating tapered washers 42 and 44. By simply inserting a spanner wrench, rod or other suitable turning mechanism into the holes or windows 20 into the holes 52 provided in the washers, the washers are, in effect, increased in overall height or thickness until they bottom firmly against the bottom surface of the nut 30. The pressure in the tensioner 10 can then be released and the tensioning apparatus removed. Inasmuch as the nut is stressed in the first instance, there will be negligible loss of load.

In order for the system to maintain the proper residual load, the washers 42 and 44 take over the holding of the load from the tensioner 10 and are the only unstressed part of the system while the tensioner is pulling. Since the contemplated washers 42 and 44 are comparatively thin, the actual compression, as stated, to assume the load is almost negligible. As explained, the nut 30 is already under load and the washers merely come up to the bottom surface and support the nut. Consequently, with this arrangement, the loss in load is extremely small.

It has been found that to achieve a certain fixed load L in a stud, using conventional tensioning techniques, would require a tensioner having a capacity of perhaps 1.5 times L. In practicing the present invention, the required capacity is in the neighborhood of 1.1 times L; and thus a much lower capacity of size of tensioner need only be used. In addition, where the bolt is required to be stressed close to its yield point, the present invention will certainly be of advantage.

Instead of the circular washers of the type illustrated in FIGS. 1 to 3, washers of the type illustrated in FIGS. 4 and 5 may be employed. In both instances, each washer will have two flat surfaces one being inclined relative to the other. In order to obtain the desired wedging action, one washer need only be slid longitudinally along a straight line relative to the other. Thus, in FIG. 4, a pair of washers 54 and 56 are illustrated having a flat surface 58 and an inclined surface 60, the latter being engageable with the inclined surface of the other washer. A central substantially oval opening 62 is provided in each washer for reception of the bolt 18, with the major dimensioning of the elliptical opening permitting the desired extent of sliding movement of the washers.

In FIG. 5, a pair of washers 64 and 66 are illustrated each having a flat surface 68 and an inclined surface 70 which is adapted to engage with the inclined surface of the other washer. The washers are essentially U-shaped in configuration, as shown, whereupon the stud 18 is adapted to be disposed between the legs of the U. These washers 64 and 66 are adapted to be slid one relative to the other along a straight longitudinal path in order to obtain the desired wedging action.

As mentioned in the above, provisions are contemplated by this invention whereby the lower end of the tensioner socket 24 does not interfere with the manipulation of the wedging means 40. This may be accomplished by preventing the lower end of the socket 24 from extending beyond the corresponding lower end of the nut 30. As an alternative, the tapered washers 42 and 44 may be of sufficiently small outer diameter so as to be within the minor diameter of the nut thread. Under these circumstances, the socket 24 is prevented from interfering with the wedging means even if its lower end is disposed beneath that of the washer 30. In the drawings, a single step set of washers is illustrated. It is contemplated by this invention that two, three, four or more steps could be employed with essentially the same total rise.

It should also be understood that this invention also contemplates providing the nut as an integral part of the stud, thereby creating in effect a cap screw. The tensioning of cap screws is a further contribution to the tensioning art of this invention.

Although several somewhat preferred embodiments of this invention have been disclosed and described in detail herein, it should be understood that this invention is in no sense limited thereby and its scope is to be determined by that of the appended claims.

I claim:
1. A stud tensioning system comprising:
a bolt;
tensioner engaging means on said bolt for cooperating with a tensioning apparatus for tensioning the bolt;
a bolt tensioning apparatus including a housing having one end adapted to thrust against the surface from which the bolt and tensioner engaging means extends, a puller bar having an end within said housing, the puller bar end and the tensioner engaging means having cooperating and releasable interengaging surfaces, and tensioning means coupled with the puller rod for tensioning the bolt by means of the tensioner engaging means;
and means for interposition between the tensioner engaging means and said surface for maintaining the bolt under tension upon deactivation of the tensioning means and release of the puller bar from the tensioner engaging means.
2. A stud tensioning system comprising:
an exteriorly threaded nut supporting bolt;
an interiorly threaded nut threadedly supported on the bolt;
a bolt tensioning apparatus including a housing having one end adapted to thrust against the surface from which the bolt extends, a puller bar having an end within said housing, the puller bar end and the nut having cooperating and releasable interengaging surfaces, and tensioning means coupled with the puller bar for tensioning the bolt by means of the nut; and
wedge means for interposition between the nut and said surface for maintaining the bolt under tension upon deactivation of the tensioning means and release of the puller bar from the nut.
3. The invention in accordance with claim 2 wherein the tensioning apparatus includes means for permitting the shifting of the wedge means into firmer wedging relationship between the nut and said surface.
4. The invention in accordance with claim 2 wherein said nut is externally threaded and the puller bar is provided with internal threads in providing said cooperating and releasable interengaging surfaces.
5. The invention in accordance with claim 4 wherein said puller bar is provided with a flange for engaging with the nut in providing a stop means for limiting the extent of threaded engagement between the puller bar and nut.
6. The invention in accordance with claim 2 wherein said wedge means comprises at least one pair of mating washers having opposed and engaged inclined mating surfaces adapted to be slid one surface on the other in providing a wedging action thereby permitting the washers to extend between the entire space provided between the nut and the said surface from which the bolt extends.

7. The invention in accordance with claim 6 wherein said washers are circular in configuration having a central circular bore receiving said bolt, with the low point of said inclined surface defining a step with the high point of said inclined surface, whereupon said washers are adapted to be rotated one with respect to the other in changing the relationship of the washers and the permissable space between the nut and the said surface from which the bolt extends.

8. The invention in accordance with claim 7 wherein said washers are provided with means for facilitating their rotation one with respect to the other.

9. The invention in accordance with claim 2 wherein said wedge means includes at least one pair of mating washers having opposed and engaged inclined mating surfaces adapted to be slid longitudinally one with respect to the other in adjusting the permissable space between the nut and the said surface from which the bolt extends.

10. The invention in accordance with claim 9 wherein each of said washers are essentially oval in configuration and include a central oval opening through which the bolt extends.

11. The invention in accordance with claim 9 wherein each of said washers are essentially U-shaped.

References Cited by the Examiner
UNITED STATES PATENTS

| | | | |
|---|---|---|---|
| 540,021 | 5/1895 | Kime | 151—34 |
| 910,712 | 1/1909 | McCoy | 151—35 |
| 1,614,221 | 1/1927 | Westbrook. | |
| 1,662,094 | 3/1928 | Wesp. | |
| 2,383,068 | 8/1945 | MacLean. | |
| 2,525,950 | 10/1950 | Saffioti | 254—29 |
| 3,115,332 | 12/1963 | Singleton et al. | 81—54 |
| 3,162,071 | 12/1964 | Biach | 81—54 |

WILLIAM FELDMAN, *Primary Examiner.*

MILTON S. MEHR, *Examiner.*